United States Patent
Karaki et al.

(10) Patent No.: US 10,594,615 B2
(45) Date of Patent: *Mar. 17, 2020

(54) METHOD FOR CONTROLLING TRANSMISSION OF DATA

(71) Applicant: TELEFONAKTIEBOLAGET L M ERICSSON (PUBL), Stockholm (SE)

(72) Inventors: Reem Karaki, Aachen (DE); Torsten Dudda, Aachen (DE); Hanzhi Zhang, München (DE); Torbjörn Wigren, Uppsala (SE); Helka-Liina Määttanen, Helsinki (FI); Stefan Wager, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,440

(22) Filed: Aug. 13, 2018

(65) Prior Publication Data

US 2019/0007328 A1 Jan. 3, 2019

Related U.S. Application Data

(63) Continuation of application No. 15/153,600, filed on May 12, 2016, now Pat. No. 10,050,894.

(60) Provisional application No. 62/160,745, filed on May 13, 2015.

(51) Int. Cl.
| | |
|---|---|
| *H04W 28/08* | (2009.01) |
| *H04L 12/841* | (2013.01) |
| *H04L 12/26* | (2006.01) |
| *H04L 12/801* | (2013.01) |
| *H04L 29/08* | (2006.01) |

(52) U.S. Cl.
CPC ........ *H04L 47/283* (2013.01); *H04L 43/0852* (2013.01); *H04L 47/34* (2013.01); *H04L 69/322* (2013.01); *H04W 28/08* (2013.01)

(58) Field of Classification Search
CPC .......... H04B 7/024; H04B 7/026; H04B 7/14; H04B 7/24; H04J 11/0023; H04J 11/0053; H04L 43/0852; H04L 47/283; H04L 47/34; H04W 28/08
See application file for complete search history.

(56) References Cited

U.S. PATENT DOCUMENTS

| | | | | |
|---|---|---|---|---|
| 10,050,894 B2* | 8/2018 | Karaki | ................ | H04L 47/283 |
| 2015/0289171 A1* | 10/2015 | Jung | .................... | H04L 1/0001 |
| | | | | 370/331 |
| 2017/0237676 A1* | 8/2017 | Sung | .................... | H04L 43/087 |
| | | | | 370/235 |
| 2017/0295029 A1* | 10/2017 | Li | ........................ | H04W 56/00 |

* cited by examiner

*Primary Examiner* — Mohamed A Kamara

(57) ABSTRACT

Methods, nodes, a wireless communication device and computer programs to be usable in association with controlling transmission of at least one data unit via a first link between a first access node and a wireless communication device and via a second link between the first access node and the wireless communication device via the second access node are described. In one embodiment, the method may be performed by the first access node and may comprise receiving first transmission delay information indicative of a transmission delay of the first link and/or second transmission delay information indicative of the second link, and controlling the transmission of said data unit based on the first and/or second transmission delay information.

16 Claims, 9 Drawing Sheets

METHOD FOR CONTROLLING TRANSMISSION OF DATA

CROSS-REFERENCE TO RELATED APPLICATION

This application is a continuation of patent application Ser. No. 15/153,600, filed May 12, 2016, which has granted to U.S. Pat. No. 10,050,894 on Aug. 14, 2018, which claims priority to and the benefit of the filing date of U.S. Provisional Application No. 62/16,0745, filed on May 13, 2015, all of which are incorporated herein by reference in their entireties.

TECHNICAL FIELD

The present disclosure relates to telecommunications and in particular to methods for controlling transmission of at least one data unit. A first and a second access node, a wireless communication device and computer program products are also described.

BACKGROUND

In cellular networks, such as a 3GPP (Third Generation Partnership Project) mobile network, various types of wireless communication devices may be used. Such a wireless communication device may for example be user equipment (UE), a mobile phone, a smartphone, a data modem, a mobile computer, or another kind of terminal device.

The present disclosure is described within the context of Long Term Evolution (LTE), i.e. Evolved Universal Terrestrial Radio Access Network (UMTS) Mobile Telecommunications System (E-UTRAN). It should be understood that the problems and solutions described herein are equally applicable to wireless access networks and wireless communication devices implementing other access technologies and standards. LTE is used as an example technology where the embodiments are suitable, and using LTE in the description therefore is particularly useful for understanding the problem and solutions solving the problem.

For ease of understanding, LTE Mobility is described in the following.

Radio Resource Control (RRC) (Third Generation Partnership Project (3GPP) Technical Specification (TS) 36.331, e.g. V10.8.5 (2013-01)) is the main signaling protocol for configuring, re-configuring and general connection handling in the LTE radio access network (E-UTRAN). RRC controls many functions such as connection setup, mobility, measurements, radio link failure and connection recovery. These functions are of relevance for the present disclosure, and are therefore described in some further detail below.

A wireless communication device in LTE can be in two RRC states: RRC_CONNECTED and RRC_IDLE. In RRC_CONNECTED state, mobility is network-controlled based on e.g. measurements provided by the wireless communication device. I.e. the network decides when and to which cell an UE should be handed over, based on e.g. measurements provided by the wireless communication device. The network, i.e. the LTE radio base station (called evolved Node Base station (eNodeB or eNB), respectively, in E-UTRAN) configures various measurement events, thresholds etc. based on which the wireless communication device then sends reports to the network, such that the network can make a wise decision to hand over the wireless communication device to a stronger cell as the wireless communication device moves away from the present cell.

Dual connectivity is one of the features being standardized within the umbrella work of small cell enhancements within 3GPP Rel-12. Dual connectivity is a feature that allows a wireless communication device to simultaneously receive and transmit to at least two different network points. The two different network points are usually denoted as master eNodeB (MeNB) and secondary eNodeB (SeNB). MeNBs serve a master cell group (MCG), and SeNBs serve a secondary cell group (SCG). It is assumed that the radio resource control (RRC) protocol, which is responsible for configuring the wireless communication device, is terminated within the MeNB. While the wireless communication device receives RRC control signaling via the MCG, it may receive user data via both MCG and SCG.

In the split bearer architecture option of dual connectivity the downlink data is split on the Packet Data Convergence Protocol (PDCP) layer in the MeNB. The MeNB may route PDCP Packet Data Units (PDUs) dynamically via MeNB Radio Link Control (RLC) to the wireless communication device directly, or via an internode interface, also known as backhaul channel, to the SeNB and SeNB RLC to the wireless communication device. The data flow from MeNB to SeNB via the internode interface is typically controlled by a flow control protocol, in order to balance the SeNB buffer fill state. For this purpose flow control feedback had been defined in 3GPP TS 36.425.

However, there is a need for techniques which allow for balancing transmission of data between an access node and a wireless communication device, particularly in a case in which the wireless communication device may be connected via two separate links with a cellular network.

SUMMARY

According to an first embodiment a method for controlling transmission of at least one data unit via a first link between a first access node and a wireless communication device and via a second link between the first access node and the wireless communication device via the second access node is provided, the method being performed by the first access node and comprising:
receiving first transmission delay information indicative of a transmission delay of the first link and/or second transmission delay information indicative of the second link, and
controlling the transmission of said data unit based on the first and/or second transmission delay information.

According to a second embodiment, a computer program product comprising program code to be executed by a processor of a first access node, thereby configuring the first access node to operate in accordance with a method as defined by the first embodiment.

According to a third embodiment a method to be used in association with controlling transmission of a data unit via a first link between a first access node and a wireless communication device and via a second link between the first access node and the wireless communication device via the second access node, is provided, the method being performed by the wireless communication device and comprising:
sending, to the first access node, first transmission delay information indicative of a transmission delay of the first link and/or second transmission delay information indicative of the second link.

According to a fourth embodiment a computer program product is provided, comprising program code to be executed by a processor of a wireless communication device, thereby configuring the wireless communication device to operate in accordance with a method as defined by third embodiment.

According to a fifth embodiment a method to be used in association with controlling transmission of a data unit via a first link between a first access node and a wireless communication device and via a second link between the first access node and the wireless communication device via the second access node, is provided, the method being performed by the second access node and comprising:

sending, to the first access node, first transmission delay information indicative of a transmission delay of the first link and/or second transmission delay information indicative of the second link.

According to a sixth embodiment a computer program product comprising program code to be executed by a processor of a second access node, thereby configuring the second access node to operate in accordance with a method as defined by the fifth embodiment.

According to a seventh embodiment a first access node for controlling transmission of a data unit via a first link between a first access node and a wireless communication device and via a second link between the first access node and the wireless communication device via the second access node, is provided, the first access node being adapted to:

receive first transmission delay information indicative of a transmission delay of the first link and/or second transmission delay information indicative of the second link, and control the transmission of said data unit based on the first and/or second transmission delay information.

According to an eighth embodiment a wireless communication device to be used in association with controlling transmission of a data unit via a first link between a first access node and a wireless communication device and via a second between the first access node and the wireless communication device via the second access node, is provided, the wireless communication device being adapted to:

send, to the first access node, first transmission delay information indicative of a transmission delay of the first link and/or second transmission delay information indicative of the second link.

According to a ninth embodiment a second access node to be used in association with controlling transmission of a data unit via a first link between a first access node and a wireless communication device and via a second link between the first access node and the wireless communication device via the second access node, is provided, the second access node being adapted to:

send, to the first access node, first transmission delay information indicative of a transmission delay of the first link and/or second transmission delay information indicative of the second link.

According to a tenth embodiment a communication system is provided, comprising a first access node according to any one of previous embodiments and a wireless communication device according to any one of the previous embodiments and optionally a second access node according to one of the ninth embodiments.

DETAILED DESCRIPTION

Figure 1:
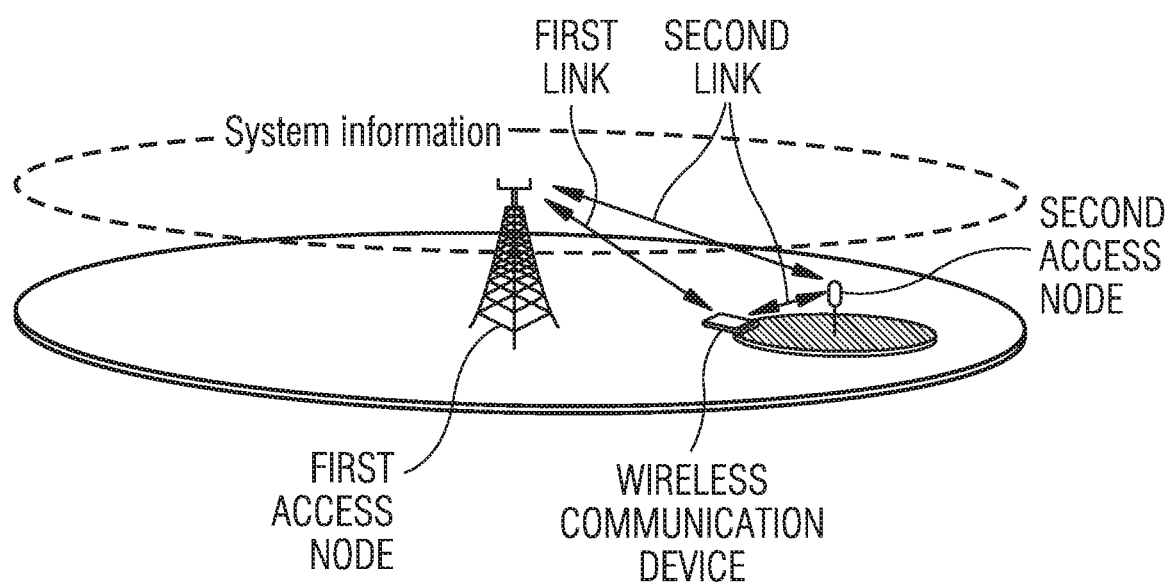
FIG. 1 schematically illustrates a cellular network environment in which concepts according to the embodiments can be applied.

FIG. 1 schematically illustrates a cellular network environment, i.e., infrastructure of a cellular network, represented by a first access node, a second access node, as well as a wireless communication device. The wireless communication device may be connect to the cellular network for transmission of user data, e.g., for reception of downlink user data from the first access node on a downlink data channel, and/or for sending of uplink user data to the first access node on an uplink data channel. The wireless communication device may however connect at the same time to the cellular network for transmission of user data, e.g., for reception of downlink user data from the second access node on a downlink data channel, and/or for sending of uplink user data to the second access node on an uplink data channel. Thus the wireless communication device in dual connectivity maintains simultaneous connections to the first and to the second access node.

A wireless communication device may communicate with the first access node and/or the second access node over a wireless interface. For example, the wireless communication device may transmit wireless signals to one or more of first access node and/or the second access node and, and/or receive wireless signals from one or more of such radio network nodes and. The wireless signals may contain voice traffic, data traffic, control signals, and/or any other suitable information.

Wireless communication device may have dual connectivity capability. Thus, Wireless communication device may be able to receive signals from and/or transmit signals to at least two different first access node and/or the second access node simultaneously, via wireless links respectively. The first access node and/or the second access node may interface with a core network node via links respectively.

The first access node and/or the second access node may interface with one or more Radio Base Stations (RBSs). The signaling connection link between first and the second access node, may comprise LTE X2 interfaces. In case the second access node is a WLN (Wireless LAN Logical Node) the interface to the second access node is denoted as Xw and for sake of convenience referred to as backhaul channel as well.

The first access node may terminate the control plane connection towards the wireless communication device and may thus be the controlling node of the wireless communication device. The wireless communication device may also obtain system information from the first access node. In FIG. 1, the system information and a spatial availability thereof are indicated by a dashed circle. In addition to the first access node, the wireless communication device may be connected to one or several second access nodes for added user plane support. Thus the performance of a wireless communication device in terms of its data peak rate may be improved, since user plane data may be additionally transmitted via the second access node. To this end, a transmission frequency employed by the first access node may be different from a transmission frequency employed by the second base station.

However, the roles of the first and the second access nodes may be exchanged, that is to say the second access node may terminate the control plane connection towards the wireless communication device and is thus the controlling node of the wireless communication device. Similarly, though the wireless communication device obtains the system information from the first access node, may or may not distribute system information to another wireless communication device, that is to say act as a relay.

Accordingly, the first access node may be embodied as a base station, for example an evolved Node B (eNB). The downlink data channel may be a Physical Downlink Shared Channel (PDSCH), and the uplink data channel may be a Physical Uplink Shared Channel (PUSCH). The transmission of downlink user data is accomplished using Orthogonal Frequency Division Multiple Access (OFDMA), and the transmission of uplink user data is accomplished using Single Carrier Frequency Division Multiple Access (SC-FDMA). The second access node may be embodied as a base station, for example an evolved Node B (or in case the first access node is a MeNB the second access node may be a SeNB) as well, having the same properties as the first access node described above. Hence, a Dual Connectivity architecture may be accomplished.

Alternatively, the second access node 304b may be configured to operate according to 802.11 technology, also referred to as WLAN (Wireless Local Access Network) and may—instead of an (M)eNB—be a node terminating 802.11 technology or WLAN, which node may be denoted in the following as WLAN logical node (WLN). Hence, a WLAN/LTE integration architecture may be accomplished.

Thus, without loss of generality, the second access node may referred to as throughout the description as a nodeB (NB), an eNodeB (eNB), secondary eNodeB (SeNB) or a WLN unless otherwise specified.

It is to be understood that the cellular network may comprise a common access network in a case both the first access node and the second access node may be embodied to operate according to the same technology. The cellular network may comprise two access networks in a case in which the first access node may be embodied to operate according to a first technology, like LTE, and the second access node and the second access node may be embodied to operate according to a second technology, like 802.11.

Figure 2:
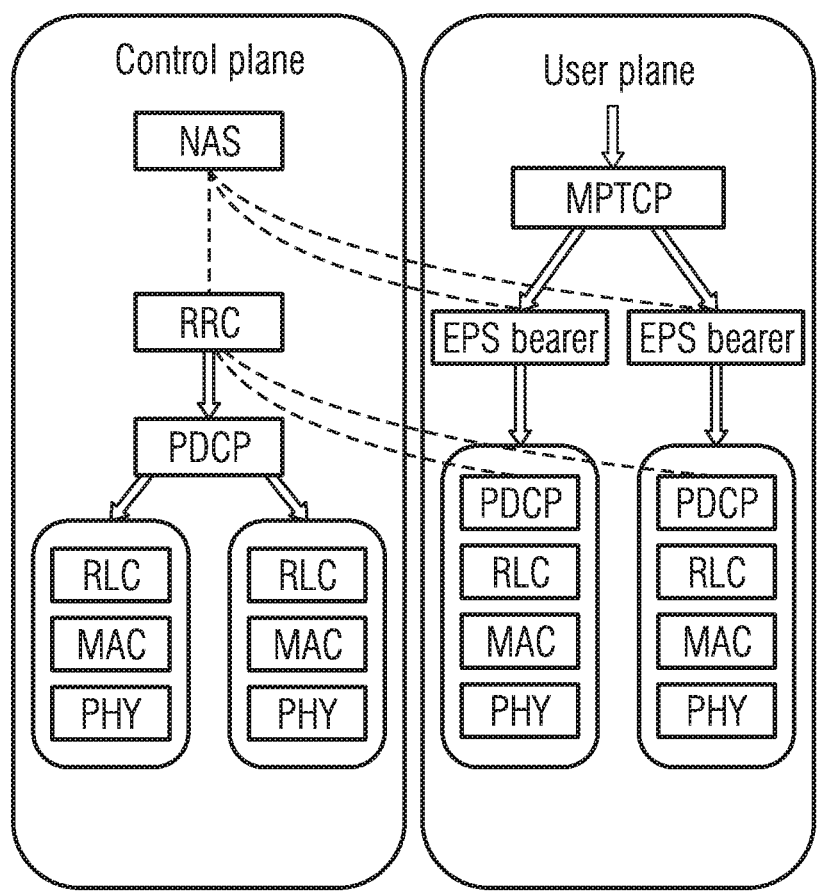
FIG. 2 shows an exemplary embodiment of a control and user plane termination in a first access node and a second access node.

FIG. 2 illustrates a control and user plane termination in a first access node and a second access node. This protocol architecture may represent an exemplary protocol termination compliant with dual connectivity. The protocol architecture shown in FIG. 2 is proposed as a way forward for realizing dual connectivity in LTE Rel-12 in deployments.

Dual connectivity is a feature defined from the wireless communication device perspective wherein the wireless communication device may simultaneously receive and transmit to at least two different network points. The at least two network points may be connected to one another via a backhaul link such that a wireless communication device may be enabled to communicate with one of the network points via the other network point. Dual connectivity is one of the features that are being standardized within the umbrella work of small cell enhancements within 3GPP Release 12 (Rel-12).

Dual connectivity is defined for the case when the aggregated network points operate on the same or separate frequency. Each network point that the wireless communication device is aggregating may define a stand-alone cell or it may not define a stand-alone cell. In this respect, the term "stand-alone cell" may particularly denote that each network point, hence each cell, may represent a separate cell from a perspective of a wireless communication device. In contrast, network points not defining a stand-alone cell may be regarded from a perspective of a wireless communication device as one same cell. It is further foreseen that from the wireless communication device perspective the wireless communication device may apply some form of Time Division Multiplex (TDM) scheme between the different network points that the wireless communication device is aggregating. This implies that the communication on the physical layer to and from the different aggregated network points may not be truly simultaneous. Thus, the principals of dual connectivity can be transferred to the case where the second access node is a WLN, enabling the wireless communication device to aggregate data transfer according to WLAN and LTE.

Dual connectivity as a feature bears many similarities with carrier aggregation and coordinated multi-point (CoMP). The main differentiating factor is that dual connectivity is designed considering a relaxed backhaul and less stringent requirements on synchronization requirements between the network points. This is in contrast to carrier aggregation and CoMP, wherein tight synchronization and a low-delay backhaul are assumed between connected network points. Hence, the wireless communication device may perceive a downlink transmission received from the first access node and the second access node to be from different nodes, whereas in CoPM the wireless communication device may perceive a downlink transmission to be received from one single node.

In the user plane a distributed Packet Data Convergence Protocol (PDCP)/Radio Link Control (RLC) approach is taken where the first access node and the second access node terminate the user planes of their respective bearers, with a possibility to realize user plane aggregation via Multipath Transmission Control Protocol (MPTCP) which may offer a split of traffic to several connections. In the control plane, the RRC and Packet Data Convergence Protocol (PDCP) are centralized at the first access node, with a possibility to route RRC messages via the first access node, the second access node, or even simultaneously at both links. For ease of completeness, "NAS" may represent a Non Access Stratum protocol layer, "RLC" may represent a Radio Resource Control protocol layer, "MAC" may represent Medium Access Control protocol layer, and "PHYS" may represent a Physical layer.

In a further exemplary protocol termination enabling dual connectivity and RRC diversity, RRC is terminated in the first access node, and PDCP is available both for the first access node and the second access node.

Figure 3:
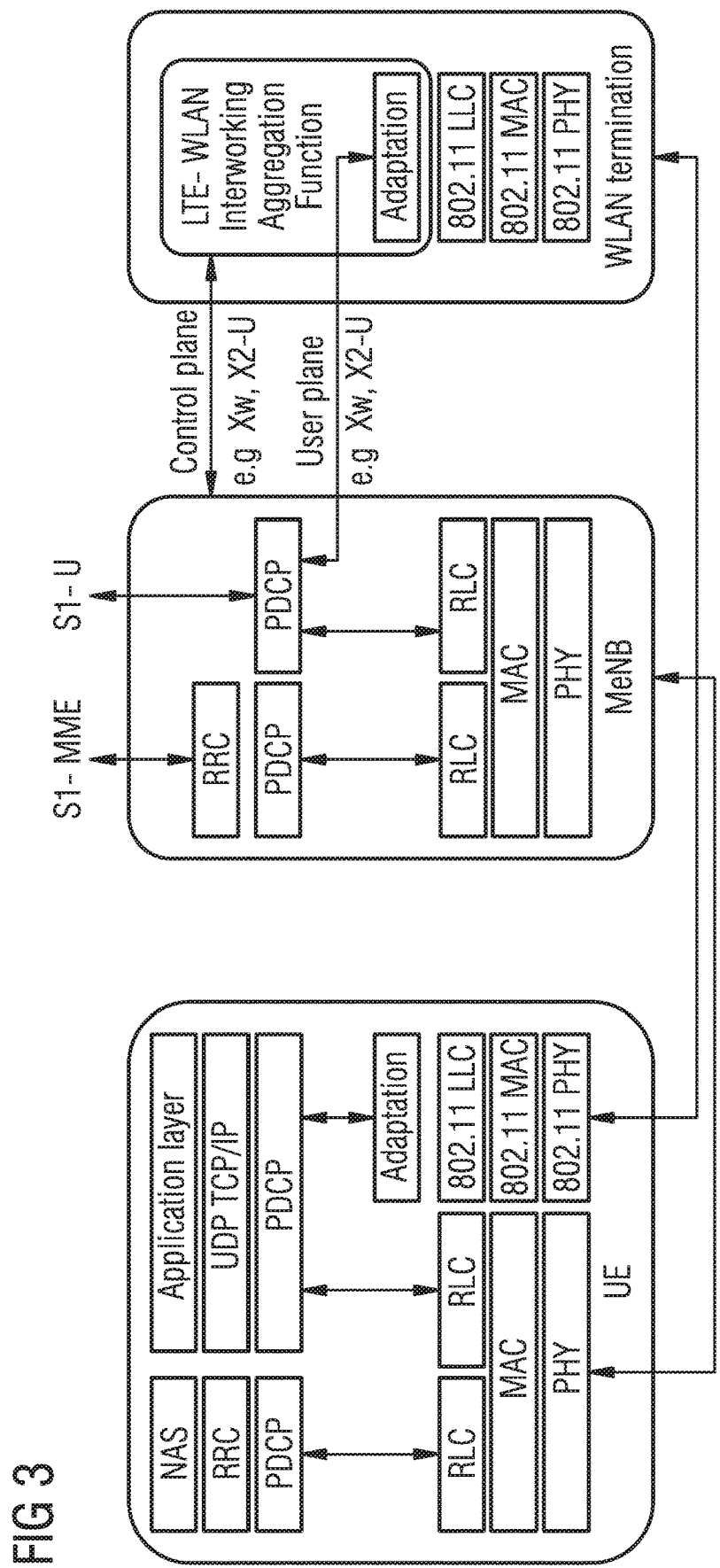
FIG. 3 shows an exemplary embodiment of an architecture for LTE-WLAN aggregation and dual connectivity respectively.

FIG. 3 shows an architecture option for LTE-WLAN aggregation which resembles the Rel-12 dual connectivity split bearer architecture, where the node terminating WLAN, WLAN logical node (WLN), assumes the role of the secondary eNB, i.e. the second access node. However the embodiment presented in the following may also be applicable to the case in which the second access node is eNB.

The second access node, that is to say the WLN, may thus be configured according to at least one of the specifications IEEE 802.11 a/h, b/g, n, ac and/or make use of radio frequencies according to IEEE 802.11 a/h, b/g, n, ac and/or data rates according to IEEE 802.11 a/h, b/g, n, ac.

In the following the LTE-WLAN aggregation is used as an example. The same algorithm can also apply in the Dual Connectivity case, as described in the above, in which the WLAN termination (WT) can be a SeNB. In LTE dual connectivity (Release 12/13) the eNB that maintains a RRC connection to wireless communication device is called master eNB (MeNB) and the other eNB which is used e.g. for offloading or aggregation of data transmission is called secondary eNB (SeNB). In LTE-WLAN aggregation, the corresponding terminology is eNB and WT or WLAN logical node (WLN). As this embodiment applies to both dual connectivity and LTE-WLAN aggregation, these terminology are used interchangeably.

LTE and WLAN aggregation is a feature where the wireless communication device may receive and transmit using links to both eNB and WLAN. In the split bearer architecture option of LTE-WLAN aggregation in the downlink data is split on the PDCP layer in the first access node, which may be an eNB. The first access node may route PDCP PDUs dynamically via eNB RLC to the wireless communication device directly, or via a backhaul channel X2, Xw to the second access node, e.g. SeNB or WLN, MAC to the wireless communication device. In the separate bearer architecture, the lower layers of a bearer are switched to LTE or WLAN meaning all PDCP packets of that bearer are routed via either LTE or WLAN. From eNB perspective, the separate bearer architecture may be seen as a static routing decision.

An adaptation layer may be provided in order to adapt PDCP packets to be transported by WLAN. However, this adaptation layer may be part of the first access node or the second access node, or parts of it in each node.

In a first operating mode of the first and/or second access node, there may be no data transmitted via a first radio link of the first access node to the wireless communication device and all the data forwarded via the second access node or no data may be transmitted via the second access node and all data transmitted via the first access node to the wireless communication device. Thus, in this first operating mode either no eNB RLC below the PDCP of the user plane bearer may be necessary, in case all packets are routed via WLAN to the wireless communication device; or as the case may be there would be no WLAN, i.e. if all packets would be routed via LTE to the UE. Thus the case may occur where the wireless communication device is connected via two links but however data is received only via one of those links.

In a second operating mode the node terminating WLAN assumes the role of the secondary eNB, that is may be a second access node. An adaptation layer may then be needed in order to adapt PDCP packets to be transported by WLAN. In this second operating mode the MeNB may route PDCP PDUs dynamically via MeNB RLC to the wireless communication device directly, or via a backhaul channel Xw to the SeNB or WiFi MAC to the wireless communication device. The first access node, e.g. in form of said eNB, may thus distribute the data units or packets as the case may be to be send via first or a second link to the wireless communication device. The first link may be a radio link between the first access node and the wireless communication device, whereas the second link may comprise a first sub-link between the access node and the second access node and a second sub-link between the second access node and the wireless communication device. The first sub-link may be wired or wireless and the second sub-connection may preferably be wireless.

The decision whether the first and/or second operating mode is employed may be based on first transmission delay information and/or the second transmission delay information received by the first access node.

For transmitting one or more data units between the first and the second access node, an interface Xw, X2 may be provided enabling, e.g. by way of a protocol, one or more of the following functions:

sequence number information for user data transferred from the first access node, e.g. MeNB, to the second access node, e.g. SeNB, for a specific E-RAB configured with the split bearer option;

Information of successful in sequence delivery of PDCP PDUs to the wireless communication device from second access node, e.g. SeNB, for user data associated with a specific E-RAB configured with the split bearer option;

Information of PDCP PDUs that were not delivered to the wireless communication device;

Information of the currently desired buffer size at the second access node, e.g. the SeNB, for transmitting to the wireless communication device user data associated with a specific E-RAB configured with the split bearer option;

Information of the currently minimum desired buffer size at the second access node, e.g. the SeNB, for transmitting to the wireless communication device user data associated with all E-RABs configured with the split bearer option.

Thus the first access node, may assign consecutive X2-U sequence numbers to each transferred X2-U packet.

The purpose of the Downlink Data Delivery Status procedure is to provide feedback from the second access node, e.g. SeNB, to the first access node, e.g. the MeNB, to allow the first access node to control the downlink user data flow via the second access node for the respective E-RAB. The second access node may also transfer uplink user data for the concerned E-RAB to the first access node together with a DL DATA DELIVERY STATUS frame within the same GTP-U PDU.

When the second access node decides to trigger the Feedback for Downlink Data Delivery procedure it may report at least one of the following:

a) the highest PDCP PDU sequence number successfully delivered in sequence to the UE among those PDCP PDUs received from the MeNB;

b) the desired buffer size in bytes for the concerned E-RAB;

c) the minimum desired buffer size in bytes for the UE;
d) the X2-U packets that were declared as being "lost" by the SeNB and have not yet been reported to the MeNB within the DL DATA DELIVERY STATUS frame.

The first access node, when receiving the DL DATA DELIVERY STATUS frame:
regards the desired buffer size under b) and c) above as the amount of data desired from the second access node being declared
from the PDCP sequence number reported under a) above within the same frame, as well as from the most recently reported PDCP sequence number(s) of all other E-RABs established for the wireless communication device;
as the momentary desired buffer sizes, independent of buffer sizes indicated in the past.
is allowed to remove the buffered PDCP PDUs according to the feedback of successfully delivered PDCP PDUs;
decides upon the actions necessary to take for PDCP PDUs reported other than successfully delivered.

This frame format is defined to transfer feedback to allow the receiving first access node to control the downlink user data flow via the second access node.

Alternatively, at least one of the above mentioned information items contained in a DL DATA DELIVERY STATUS frame may be received in accordance with an embodiment not (only) from the second access node but from the wireless communication device. The wireless communication device may hence transmit this information or other information indicative thereof via a first radio link between the wireless communication device and the first access node. Thus the transmission delay information containing at least one of the above items may be send from the wireless communication device to the first access node.

Additionally, the wireless communication device may transmit transmission delay information indicative of a transmission delay of the first link and/or second transmission delay information indicative of the second link.

The first access node, which is preferably adapted according to LTE release, i.e. a MeNB, a eNB or the like, may for each newly incoming data or at each reception of each transmission delay information, or periodically, estimate the delay of a new packet (or of each of a number of packets in the queue) to reach the wireless communication device via the first and/or the second link. Thus the transmission delay information may comprise information indicative of delay of data transmission via the first link, and/or the second link, as for example the backhaul latency and second access node, e.g. SeNB or WLN, queuing time. It is also to be mentioned that the terms packet and data unit are used interchangeably.

Based on the transmission delay information, the first access node, e.g. a (M)eNB, may determine via which link to send the new packet to the wireless communication device. Thus the first or the second link is selected based on the transmission delay information received from the wireless communication device.

The first access node may decide which link to select based on e.g. at least one of the following criteria:
i) the first access node may determine a latency for transmission of at least one data unit via the first link based on the information received from the wireless communication device. The first access node may also determine a backhaul latency, i.e. latency via a sub-link of the second link, and/or a queueing time, e.g. of a buffer, at the second access node. If this latency for transmission via the first link is larger or equal than the backhaul delay and/or queueing time for the at least one data unit the second link is selected. The least one data unit is then transmitted to the wireless communication device via the second access node.
ii) the first access node may determine a latency for transmission of at least one data unit via the first link based on the information received from the wireless communication device. If the latency for transmission via the first link is smaller than the backhaul latency and/or queueing time, as described above, the at least one data unit the first link is selected and the at least one data unit is transmitted to the wireless communication device via the first access node (only) and/or kept in a shared buffer at the first access node, e.g. the (M)eNB.

Thus in the case of dual connectivity or LTE-WLAN aggregation the transmission control, i.e. the distribution of one or more data units between the first and the second access node, can be implemented. Controlling and/or balancing the buffering between the first access node, e.g. eNB, and the second access node, e.g. the WLN, based on the wireless communication device feedback in the form of first and/or second transmission delay information, or based on feedback from both wireless communication device and the second access node may accordingly be achieved.

By organizing the respective buffers at the first and/or the second access node, respectively, e.g. eNB and WLN buffers, end user performance in terms of lower end to end download delays is improved. This is achieved by wireless communication device assisted transmission control and/or by considering, i.e. taking into account, the received transmission delay information when determining whether to forward one or more data units to the second access node, e.g. WLN, or submit them directly to the wireless communication device via the first access node, e.g. the MeNB itself.

Furthermore, PDCP feedback, e.g. one or more PDCP PDU sequence numbers may be provided to the first access node, e.g. the (M)eNB. This information can be included in controlling the transmission of the at least one data unit. Furthermore, the controlling can also be based on information provided partly by wireless communication device and the second access node, e.g. the WLN, as already described in the above.

Thus an improved end user experience by lower download times due to efficient transmission control and buffering at the first access node side and/or second access node respectively may be achieved.

The PDCP data may be split between two paths to be sent to the wireless communication device. In the example of LTE-WLAN aggregation PDCP PDUs are either sent via the first access node, e.g. using e.g. RLC, to the wireless communication device via a first radio link, or sent to the second access node, e.g. the WLN, via a backhaul channel and transmitted from there to the wireless communication device via a second radio link.

Transmission control thus may involve or require controlling the amount of data to be transmitted via each path, i.e. in order to neither overflow nor underflow the transmission buffer in the first and/or second access node, e.g. the WLN. There may be a transmission controller present in the first access node to evaluate the information received. The transmission controller may be arranged between the PDCP layer and the corresponding interface, e.g. X2 or Xw, for transmission of data to the wireless communication device and/or the second access node. Since this transmission control operation acts below PDCP, the transmission controller can take into account PDCP related information such as PDCP PDU sequence number and/or acknowledgements when selecting the link for transmission.

Where only a single link from the first access node to the wireless communication device is present (single connectivity), a RLC transmitter entity provides the sequence number of a PDU successfully transmitted to a PDCP transmitter by a local acknowledge, however, in the case where a first and a second link to the wireless communication device is present, e.g. in LTE-WLAN aggregation or dual connectivity, some PDCP packets may be sent via the second access node, e.g. WLAN, where no RLC entity is present. Thus controlling transmission may be achieved based on information provided by the wireless communication device. Accordingly, controlling transmission may rely partly or solely on the information, e.g. the transmission delay information, received from the wireless communication device.

According to a PDCP reception algorithm in the wireless communication device, the PDCP transmitter must not bring more than half of the sequence number (SN) space in flight. That is, if half the SN space is in flight, the transmitter needs to wait for acknowledgements of successful transmission to the wireless communication device, e.g. a sequence number indicating a value below half the sequence number space, before sending a further data unit. Hence, the information about successfully received PDCP PDUs can be sent from the wireless communication device to the first access node, e.g. the MeNB.

In order to avoid signaling overhead, i.e. that in the wireless communication device based transmission control, e.g. in LTE-WLAN aggregation case, the wireless communication device needs to report the highest successfully received PDCP packet's SN to the first access node, e.g (M)eNB, this SN can be reported in an incremental way: the wireless communication device e.g. reports the difference of the current SN and the last reported SN. Thereby the number of bits used for transmission delay information may be reduced. This information may be be transmitted via the PDCP Control PDU. Additionally a PDCP status report providing a list of all received SNs may be provided. However, as already mentioned, only the highest SN received by the wireless communication device may be provided.

After the first access node, e.g. (M)eNB, receives the information indicative of the highest successfully received PDCP packet's SN, it may compare it with the next PDCP packet's SN (assigned to a data unit newly received at the first access node), thus knows how many PDCP PDUs are in flight. The PDCP transmission can then be halted when more than half of the packets are in flight. The transmission can then be resumed when less than half the SN space is in flight.

Now referring to the case of LTE-WLAN aggregation, the WLN may not comprise a RLC layer and may not transmit the PDCP PDU acknowledgements from the wireless communication device back to the first access node, e.g. to the (M)eNB. However, a software and/or hardware may be implemented in the WLN for this purpose. Accordingly the WLN may not possess information about the highest successfully received PDCP PDU's SN at the wireless communication device.

Beside the information for the PDCP transmitter, the wireless communication device may also provide additional transmission delay information for the flow controller, as further described below: In addition to the highest received PDCP SN reported by the wireless communication device, the wireless communication device may also report the PDCP PDU's delays of both links to the first access node, e.g. (M)eNB, to let the first access node, e.g. the (M)eNB, know which link is faster. The delay values of both links, i.e. the first link and the second link, can be absolute values of each packet or values that are averaged over a certain amount of time.

Another option of the transmission delay information is that the wireless communication device transmits the delay difference between the two links, i.e. delay of first access node minus delay of second access node. This value can be quantized into N bits, or mapped to a predefined table that are known at both the first access node, e.g the (M)eNB, and wireless communication device.

After the first access node, e.g. the (M)eNB, receives this delay information, it determines which link to use for the next PDCP packet (i.e. the one or more next data units in the shared buffer in the first access node, e.g. the (M)eNB). This may be done in the following manner:

Besides the highest successfully received PDCP's SN field and the delay field, the PDCP Control PDU from the wireless communication device can also comprise at least one of the following fields:

Throughput of first access node, e.g. the (M)eNB, and/or the second access node, e.g. WLN or (S)eNB as the case may be, identifier, e.g. a bit, for indicating that this is a control PDU (not carrying user data), although the data unit may either be control a user data PDU:

PDU Type, e.g. 3 bits indicating that this is a PDU for PDCP and flow control feedback, a count of missing PDUs, which were e.g. not received by the wireless communication device, a list of missing PDUs (below the highest successfully received SN), e.g. PDUs for which the reordering timer had expired so that the highest successfully received SN was increased, If necessary the transmission delay information can be an extension to a PDCP data PDU, wherein:

all fields of a normal PDCP data PDU a reserved bit could be used to indicate that transmission delay information is included.

This PDCP Control PDU transmission delay information can be transmitted periodically or on-demand from the wireless communication device, e.g upon a request from the first access point. The periodicity may be pre-configured by the first access node, e.g. (M)eNB, or the first access node, e.g. (M)eNB, can also include the timestamps only in those packets, for which it demands the transmission delay information from the wireless communication device. The previously listed transmission delay information options may be configured by the first access node, e.g. (M)eNB.

The transmission delay information for the uplink and/or the downlink delay between the wireless communication device and the first and the second base station respectively may be considered independently. Thus a transmission delay information may contain downlink and/or uplink information relating to the respective wireless communication device link to the first or the second access node.

In addition to the first transmission delay information mentioned in the above a second transmission delay information may be received by the first access node. This second transmission delay information may be received from the second access node. This would hence result in a combined scheme transmission control taking into account the first and the second transmission delay information when determining and/or selecting which way to transmit the at least one data unit to the wireless communication device. Thereby the performance of data unit transmission to the wireless communication device may further be improved. In accordance with this embodiment controlling transmission may be achieved based not only on the information received from the wireless communication device but also based on information received from the second access node.

In another embodiment the wireless communication device may send e.g. PDCP feedback, containing or indicating one or more PDCP SNs, to the first access node, e.g. (M)eNB, but transmission delay information would be sent from the second access node, e.g. the WLN to the (M)eNB. Thus the information contained in the first transmission delay information may be complementary to the one contained in the second transmission delay information.

Figure 4:
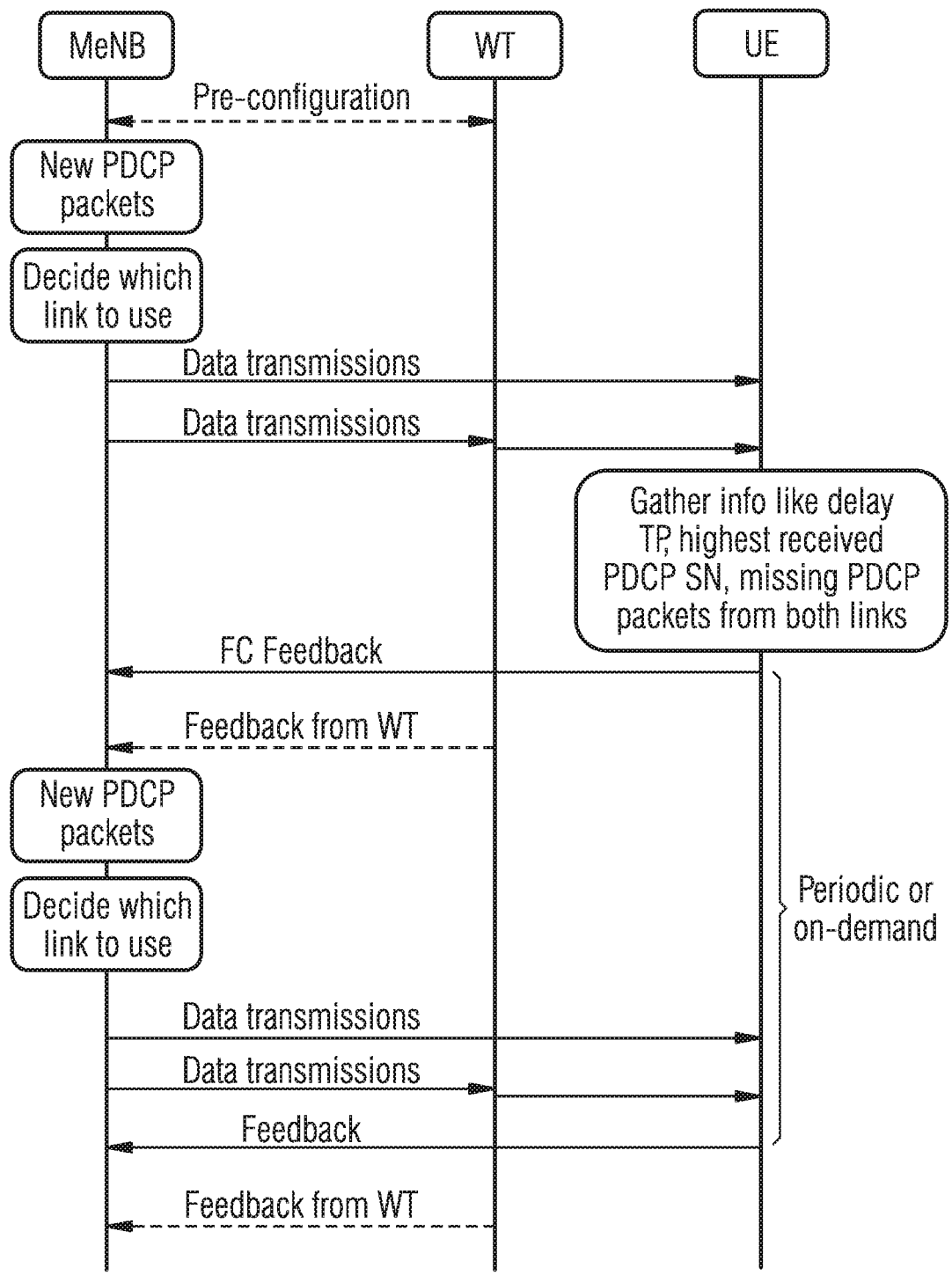
FIG. 4 shows a signaling diagram for schematically illustrating exemplary procedures according to an embodiment.

In FIG. 4 a signaling diagram involving a feedback scheme in accordance with above described embodiments is depicted. Therein the first access node, denoted as MeNB in FIG. 4, has a pre-configure scheme for controlling data transmission, e.g. which amount of data to forward to the second access node. The first access node then sends data via the backhaul channel to the second access node, in this case an WLN or WT, which second access node forwards the data to the wireless communication device, denoted herein as UE. Therein the backhaul channel and radio link between the second access node and the wireless communication device are part of the second link. The first access node may also send data via a first radio link between the first access node and the wireless communication device directly to the wireless communication device. This first radio link being said first link, by way of example.

The wireless communication device may obtain data relating to transmission delay, throughput, highest received PDCP SN, missing PDCP packets etc. This information or information indicative thereof may then be transmitted to the first access node via the first radio link—denoted as Flow control Feedback, i.e. FC Feedback in FIG. 4, Additionally, as described in the framework of this disclosure, further information for transmission control may be received by the first access node from the second access node, denoted as Feedback from WT in FIG. 4.

The first access which has new PDCP packets to transmit to the wireless communication device, thereupon decides or determines whether to use the first or the second link for transmission of said new PDCP packets or a data unit in general. According to this distribution scheme determined the data unit or data units are then transmitted to the wireless communication dives using said first or second link.

After receiving the data transmitted from the first access node via the first or second link the wireless communication device may again send feedback, e.g. first transmission delay information indicative of a transmission delay of the first link and/or second transmission delay information indicative of the second link or a highest sequence number of a data unit among data units, which data unit was successfully sent to the wireless communication device. The second access node may as well send feedback containing first transmission delay information indicative of a transmission delay of the first link and/or second transmission delay information indicative of the second link to the first access node for transmission control. These steps or part thereof may be executed periodically or on-demand, e.g. by a request of the first access node to the wireless communication device or the second access node.

Figure 5:
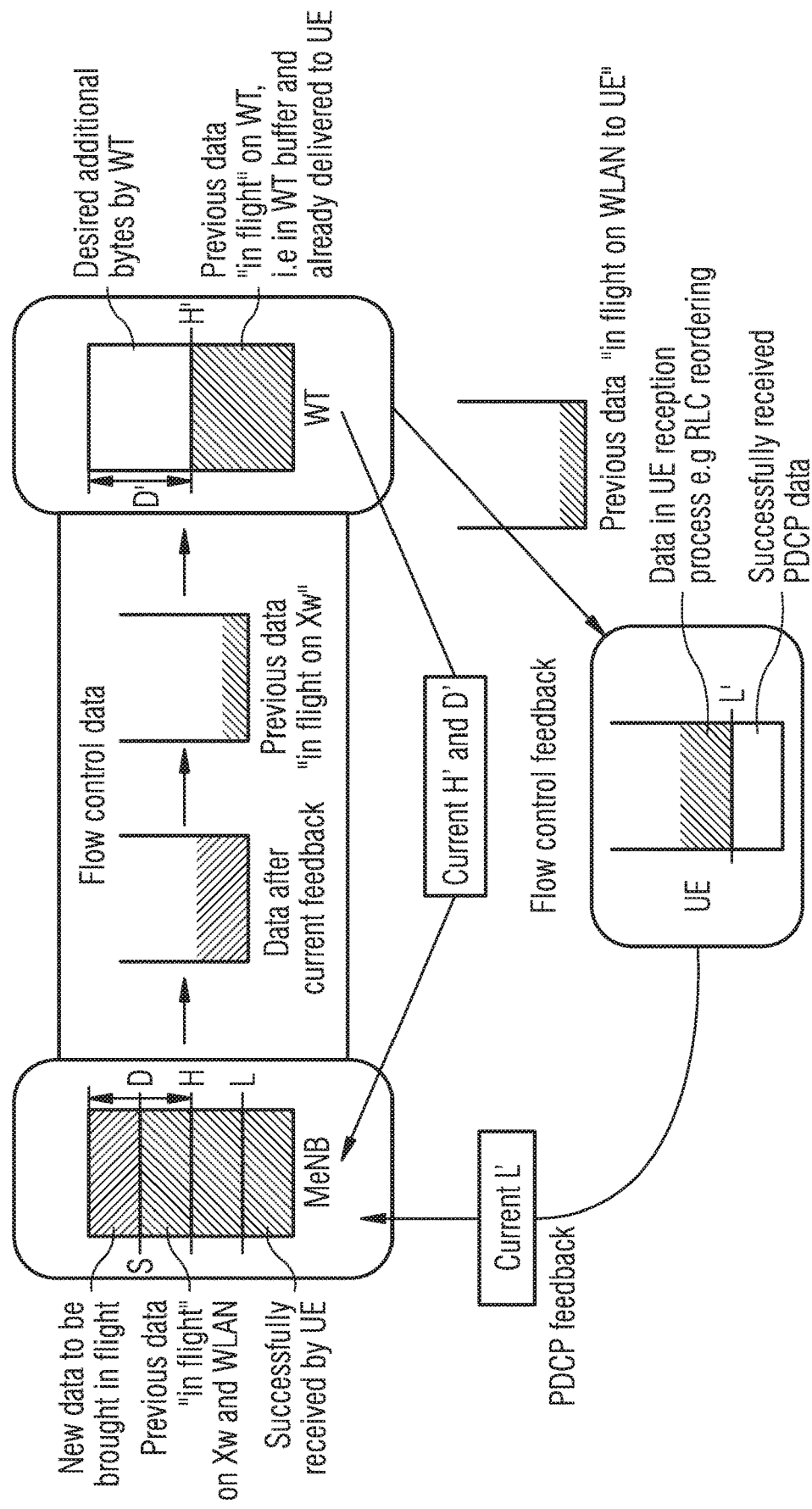
FIG. 5 shows a scheme of combined first transmission delay information from wireless communication device and additional second transmission delay information from a second access node, which second access node may also provide the first access node a desired amount of data.

As mentioned above, in the case of LTE-WLAN aggregation, the second access node might not have an RLC layer or the like and may thus not be aware e.g. about the highest successfully transmitted PDCP PDU SN to the wireless communication device. This highest successfully transmitted PDCP PDU SN is typically used as the lower window edge in a window based transmission control scheme. Thus an alternative window based transmission control of at least one data unit option is described in the embodiment below:

In accordance with FIG. 5 the second access node, e.g. the WLN, may send the highest window edge of its transmission buffer to the first access node, e.g. the (M)eNB, i.e. the last SN in its buffer, i.e. the last SN it received from the first access node via the backhaul channel. In addition, the second access node, e.g. the WLN, indicates the amount of additional data, e.g. how much bytes, the second access node, e.g. the WLN, wants to have more in its buffer, e.g. an offset of bytes to the highest window edge. With these two values the first access node, e.g. the (M)eNB, can determine how much more data is to be transmitted to the wireless communication device via the second access node.

Relating to FIG. 5:

H' denotes the highest window edge in the buffer of the second access node, e.g. WLN, i.e. the highest SN received via Xw (backhaul channel) from the first access node, e.g. the MeNB:

D' denoted the desired amount of additional data, e.g. in bytes, by second access node, described as offset to H'. The second access node, e.g. the WLN, may be adapted to determine D', e.g. based on a throughput estimate, current load and/or QoS; Based on this information the first access node may be configured to determine an amount of data that is to be transmitted to satisfy the second access node's request.

Additionally, the wireless communication device may provide information of the lower window edge, e.g. via the first transmission delay information, which lower window edge may be for example the highest successfully received PDCP SN by the wireless communication device. This information is used by the PDCP transmitter in the first access node to determine the PDCP data in flight, i.e. transmitted but not yet received. Optionally or alternatively the wireless communication device may be configured to indicate a list of missing SNs to the first access node, e.g. the (M)eNB.

The first access node may process the information received from the wireless communication device and/or from the second access node, e.g. by way of the first and/or second transmission delay information, in order to control transmission. This may be achieved based on first transmission delay information, e.g. controlling the transmission based on the (total) data packets in flight. In addition to that the first access node may rely on second transmission delay information from the second access node, for example based on the desired data.

Figure 6:
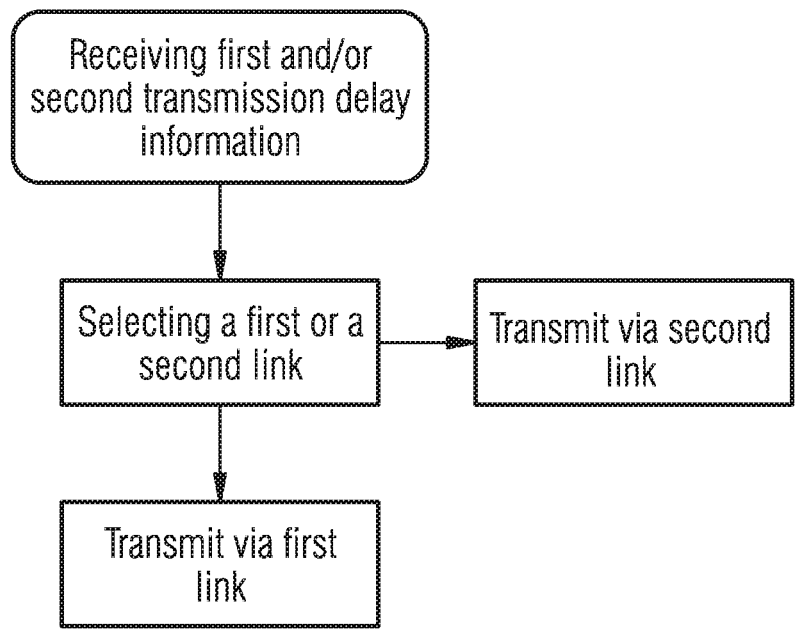
FIG. 6 shows a flow chart illustration of an embodiment with regard to the first access node.

Now referring to FIG. 6, the method for controlling transmission of at least one data unit via a first link between a first access node and a wireless communication device and via a second link between the first access node and the wireless communication device via the second access node is described. The method is performed by the first access node and may comprise the step of receiving first transmission delay information indicative of a transmission delay of the first link and/or second transmission delay information indicative of the second link.

The method may as well comprise the step of controlling the transmission of said data unit based on the first and/or second transmission delay information.

The method may as well comprise the step of receiving, from the wireless communication device, a highest sequence number of a data unit among data units, which data unit was successfully sent to the wireless communication device, wherein the step of controlling is further performed based on the highest sequence number. The first transmission delay information, the second transmission delay information and/or the highest sequence number may be received together in one message or in two or more messages.

The method may further comprise selecting for the transmission of said data unit the first link or the second link, in order to implement the above mentioned step of controlling.

The method may as well comprise that the first transmission delay information is received from the wireless communication device or the second access node, and/or that the second transmission delay information is received from the wireless communication device or the second access node.

Said first and/or second transmission delay information may comprise at least one information selected from the group of information comprising:
- a transmission delay, preferably a latency, for the transmission via said first and/or said second link,
- time difference information specifying a time difference between a first transmission delay for a transmission via the first link, and a second transmission delay for a transmission via the second link,
- throughput information specifying a first throughput for data units via the first link and/or a second throughput for data units via the second link.
- information specifying a number of not successfully received data units
- identification information identifying the sequence number of not successfully received data units,
- a highest sequence number of a data unit among data units, which data unit was successfully sent the second access node, and
- information specifying an amount of data to be storable in the second node The method may as well comprise that the transmission delay of the first link comprises a transmission time via the first link and optionally a processing time of a data unit at the first access node and optionally a processing time at the wireless communication device.

The method may as well comprise that the transmission delay of the second link comprises a processing time of a data unit at the first access node, a processing time at the second access node and a transmission time via the second link.

Processing time at an entity such as the first access node, second access node and the wireless communication device, may include time related to, for example, processing the data unit via protocol layers in a protocol stack implemented in the respective entity.

The method may as well comprise that the first transmission delay information is included in a packet data convergence protocol (PDCP) packet data unit (PDU).

The method may further comprise that PDCP PDU is a PDCP control PDU, which optionally comprises at least one of:
- information specifying that the PDCP control PDU only comprises control information, and
- information specifying that the transmission delay information is included in a PDCP data unit and comprises the transmission delay information.

The method may further comprise that the PDCP PDU is a PDCP payload PDU which optionally comprises:
- information specifying that the transmission delay information is included in a PDCP data unit and comprises the transmission delay information.

The method may further comprise the step of determining, based on the received transmission delay information, whether the transmission delay for the first link is higher than the transmission delay for the second link, wherein the step of controlling is performed based on a result of the step of determining.

The method may further comprises the step of transmitting said data unit via the first link if the transmission delay for the first link is smaller than the transmission delay for the second link, and else, transmitting said data unit via the second link.

The method may further comprise the step of determining, based on the highest sequence number, whether the received highest sequence number is below a value indicating half of a sequence number space defining an allowable transmission window for the first access node, wherein the step of controlling and/or the step of transmitting is performed if the received highest sequence number is below the value indicating half of a sequence number space. This step of determining may be performed prior to the step of determining whether the transmission delay for the first link is higher than the transmission delay for the second link. The step of determining whether the transmission delay for the first link is higher than the transmission delay for the second link may only be performed if the determination whether the received highest sequence number is below the value is in the affirmative.

The method may further comprise controlling transmission of a plurality of data units, and the step of determining and/or the step of controlling being performed individually for each data unit. For example, for each data unit to be sent to the wireless communication device, the method may comprise the step of determining whether the received highest sequence number is below the value, the step of determining whether the transmission delay for the first link is higher than the transmission delay for the second link, and step of controlling.

The method may further comprise controlling transmission of a plurality of data units, wherein the step of determining and/or the step controlling is performed for a plurality of data units. For example, for a plurality of data units to be sent to the wireless communication device, the method may comprise only once the step of determining whether the received highest sequence number is below the value and only once the step of determining whether the transmission delay for the first link is higher than the transmission delay for the second link, and only once step of controlling. In this controlling step, the plurality of data units may be sent via one single link selected in the step of controlling.

Figure 7:
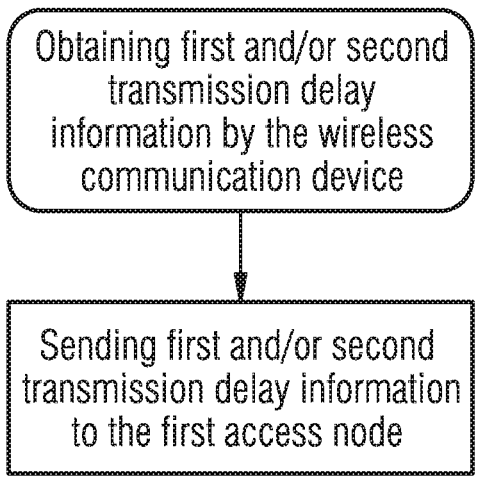
FIG. 7 shows a flow chart illustration of an embodiment with regard to the wireless communication device.

Now referring to FIG. 7 a method to be used in association with controlling transmission of a data unit via a first link between a first access node and a wireless communication device and via a second link between the first access node and the wireless communication device via the second access node is described. The method may be performed by the wireless communication device. The method may comprise the step of obtaining first and/or second transmission delay information, e.g. by the wireless communication device. This first and/or second transmission delay information may be determined by the wireless communication device or received by the wireless communication device via the first and/or second link. The method may further comprise the step of sending, to the first access node, first transmission delay information indicative of a transmission delay of the first link and/or second transmission delay information indicative of the second link.

Figure 8:
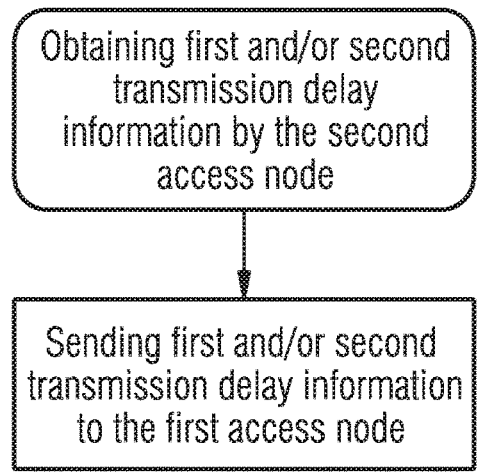
FIG. 8 shows a flow chart illustration of an embodiment with regard to the second access node.

Now referring to FIG. 8 the method to be used in association with controlling transmission of a data unit via a first link between a first access node and a wireless communication device and via a second link between the first access node and the wireless communication device via the second access node are described. The method may be performed by the second access node. The method may comprise the step of obtaining first transmission delay information indicative of a transmission delay of the first link and/or second transmission delay information indicative of the second link by the second access node. The method may further comprise the step of sending, to the first access node, first transmission delay information indicative of a transmission delay of the first link and/or second transmission delay information indicative of the second link.

Figure 9:
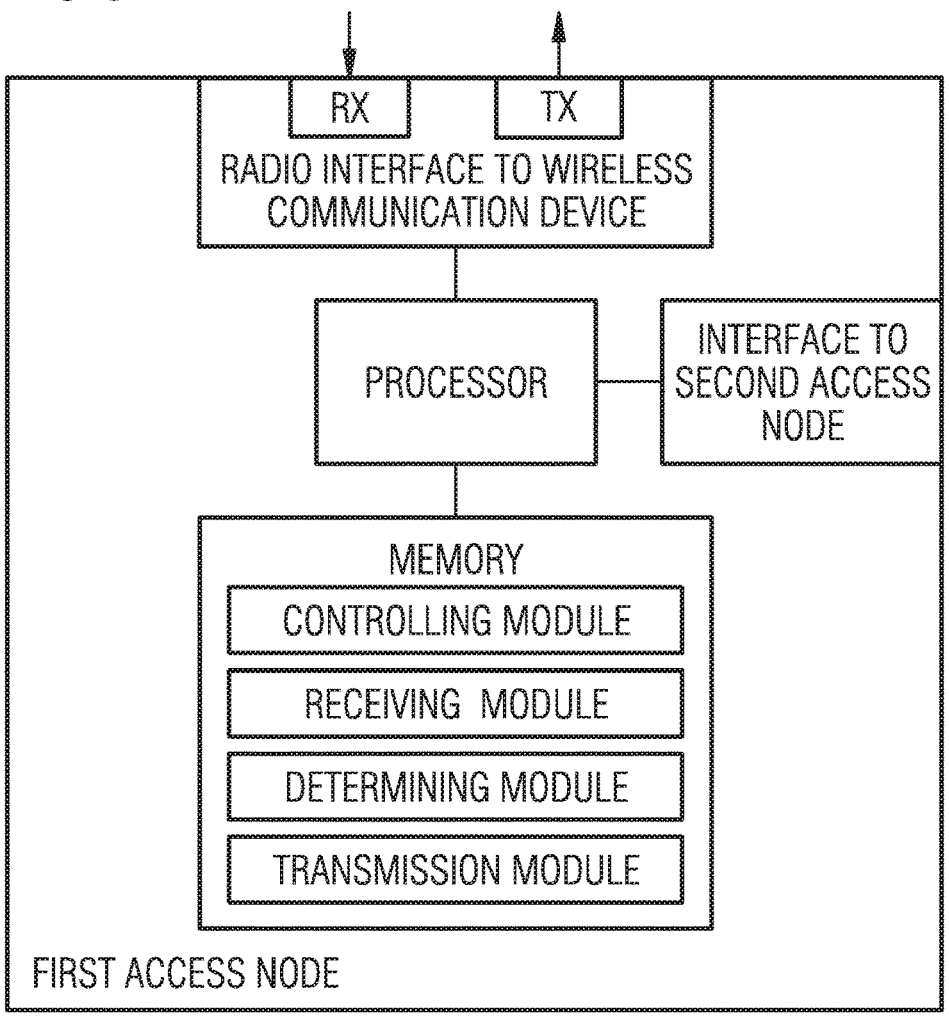
FIG. 9 schematically illustrates exemplary structures for implementing the above-described concepts in the first access node.

Now referring to FIG. 9, exemplary structures for implementing the above-described concepts in the first access node are schematically illustrated.

In the illustrated structure, the first access node includes a radio interface for performing data transmission to or from the wireless communication device via a first (radio) link. It is to be understood that for implementing transmitter (TX) functionalities the radio interface includes one or more transmitters, and that for implementing receiver functionalities (RX) functionalities the radio interface may include one or more receivers.

In the above-mentioned LTE scenario, the radio interface may correspond to the Uu interface of the Evolved Universal Terrestrial Radio Access Network (E-UTRAN). Further, the first access node may comprise a further interface for performing data transmission to and from a further access node, such as the above described second access node, via a second link. The interface may enable wireless and/or wired transmission. Alternatively, the first access node may only comprise one interface implementing functionalities of the above described interfaces.

Further, the first access node includes a processor coupled to the radio interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the first access node. More specifically, the memory may include a module for accomplishing provision of: controlling the transmission of said data unit based on the first and/or second transmission delay information. Further, the memory may also include a receiving module for receiving first transmission delay information indicative of a transmission delay of the first link and/or second transmission delay information indicative of the second link. Further, the memory may include an determining module, e.g., for determining, based on the received transmission delay information, whether the transmission delay for the first link is higher than the transmission delay for the second link, wherein the step of controlling is performed based on a result of the step of determining. The determining module may also serve for determining, based on the highest sequence number, whether the received highest sequence number is below a value indicating half of a sequence number space defining an allowable transmission window for the first access node, wherein the step of controlling and/or the step of transmitting is performed if the received highest sequence number is below the value indicating half of a sequence number space. Alternatively, two different determining modules for implementing the aforementioned determinations may be provided in the memory. The memory may also comprise a transmitting module for transmitting said data unit via the first link if the transmission delay for the first link is smaller than the transmission delay for the second link, and else, transmitting said data unit via the second link.

It is to be understood that the structure as illustrated in FIG. 9 is merely schematic and that the first node may actually include further components which, for the sake of clarity, have not been illustrated, e.g., further interfaces or additional processors. Also, it is to be understood that the memory may include further types of program code modules, which have not been illustrated. For example, the memory may include program code modules for implementing typical functionalities of a device access node or program code of one or more applications to be executed by the processor. According to some embodiments, also a computer program product may be provided for implementing concepts according to embodiments disclosed herein, e.g., a computer-readable medium storing the program code and/or other data to be stored in the memory.

The first access node may further comprise one or modules for carrying out the embodiments as described with regards to FIGS. 1-8.

Figure 10:
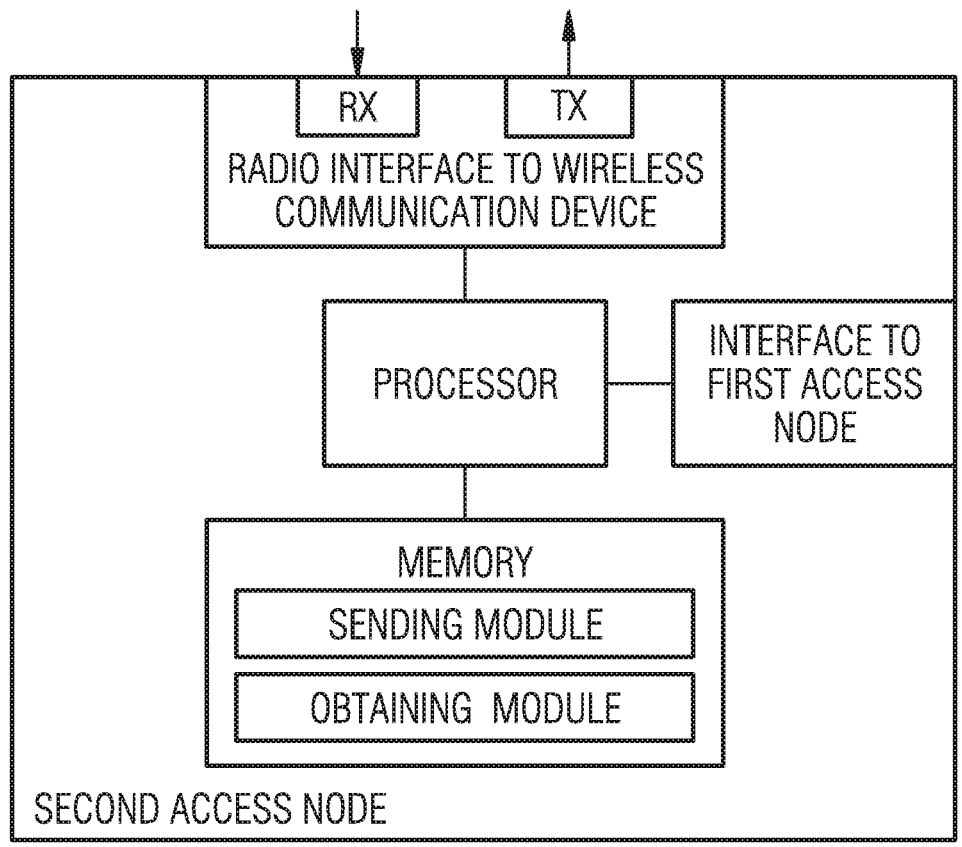
FIG. 10 schematically illustrates exemplary structures for implementing the above-described concepts in the second access node.

Now referring to FIG. 10 exemplary structures for implementing the above-described concepts in the second access node is shown. In the illustrated structure, the second access node includes a radio interface for performing data transmission to or from the wireless communication device via a second link. It is to be understood that for implementing transmitter (TX) functionalities the radio interface includes one or more transmitters, and that for implementing receiver functionalities (RX) functionalities the radio interface may include one or more receivers. In the above-mentioned LTE or WLAN scenario, the radio interface may correspond to the Uu interface of the Evolved Universal Terrestrial Radio Access Network (E-UTRAN) or according to IEEE 802.11 a/h, b/g, n, ac and/or make use of radio frequencies according to IEEE 802.11 a/h, b/g, n, ac and/or data rates according to IEEE 802.11 a/h, b/g, n, ac. Further, the second access node may comprise a further interface for performing data transmission to and from a further access node, such as the above described first access node, via a second link. The interface may enable wireless and/or wired transmission. Alternatively, the second access node may only comprise one interface implementing functionalities of the above described interfaces.

It should be understood that the radio interface to the wireless communication device and the interface to the first access node may be combined in one interface only.

Further, the second access node includes a processor coupled to the radio interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the first access node. More specifically, the memory may include a module for accomplishing provision of: sending to the first access node, first transmission delay information indicative of a transmission delay of the first link and/or second transmission delay information indicative of the second link. Additionally, the memory may include a module for accomplishing provision of: obtaining first transmission delay information indicative of a transmission delay of the first link and/or second transmission delay information indicative of the second link by the second access node.

It is to be understood that the structure as illustrated in FIG. 10 is merely schematic and that the second node may actually include further components which, for the sake of clarity, have not been illustrated, e.g., further interfaces or additional processors. Also, it is to be understood that the memory of the second node may include further types of program code modules, which have not been illustrated. For example, the memory may include program code modules for implementing typical functionalities of an access node, e.g. LTE and/or WLAN, or program code of one or more applications to be executed by the processor. According to some embodiments, also a computer program product may be provided for implementing concepts according to embodiments of the embodiments disclosed herein, e.g., a computer-readable medium storing the program code and/or other data to be stored in the memory.

The second access node may further comprise one or modules for carrying out the embodiments as described with regards to FIGS. 1-8.

Figure 11:
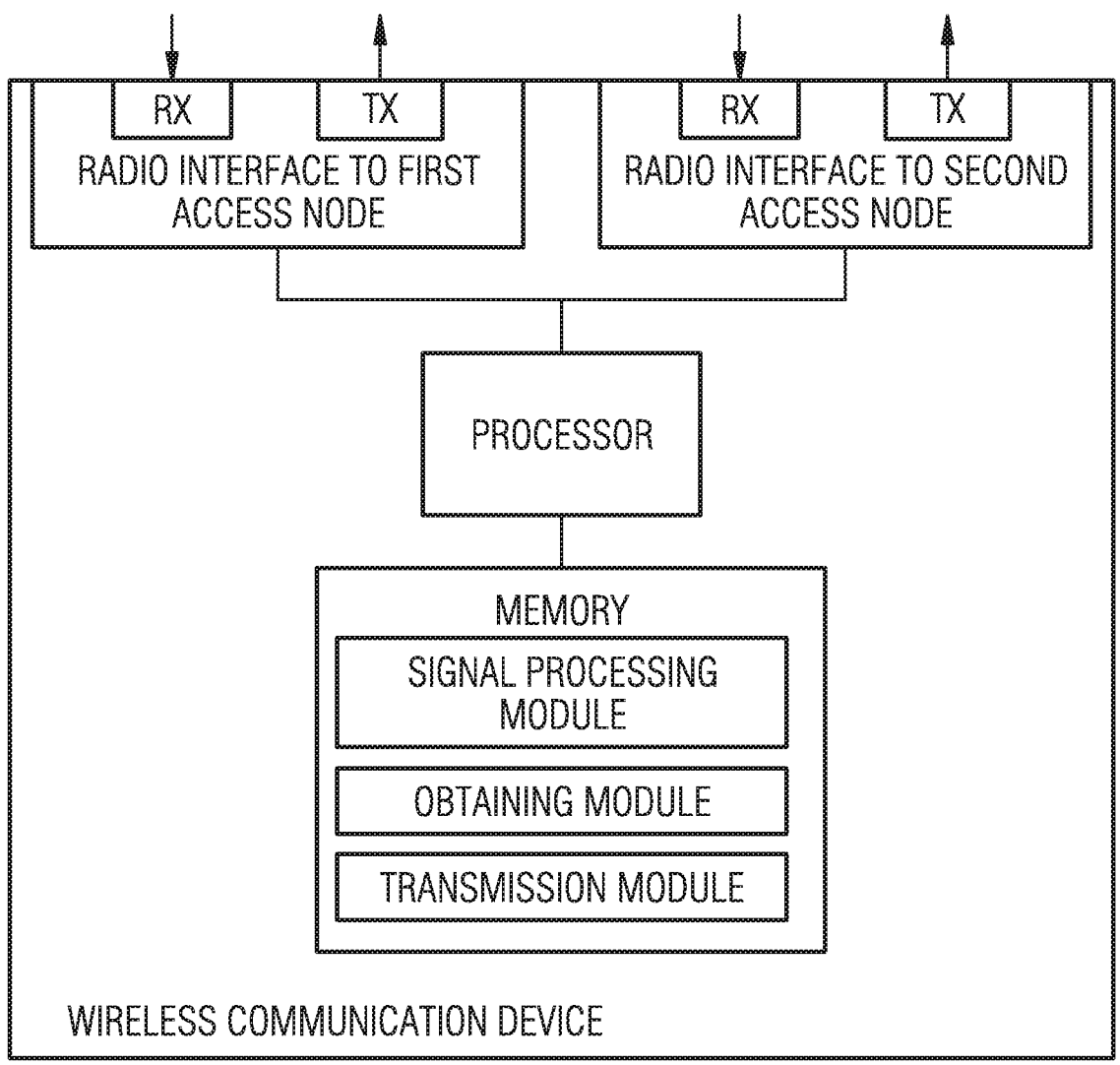
FIG. 11 schematically illustrates exemplary structures for implementing the above-described concepts in the wireless communication device.

Now referring to FIG. 11, exemplary structures for implementing the above-described concepts in the wireless communication device are shown. In the illustrated structure, the wireless communication device includes a first and a second radio interface for performing data transmission to or from the first access node via a first radio link and to the second access node via another radio link. However, it should be understood that only one interface for communication with the first and the second access node may be present. Thus, the radio interface to the first access node and the second access node may be combined in one interface only. It is also to be understood that for implementing transmitter (TX) functionalities the first and/or second radio interface includes one or more transmitters, and that for implementing receiver functionalities (RX) functionalities the radio interface may include one or more receivers. In the above-mentioned LTE or WLAN scenario, the radio interface may correspond to the Uu interface of the Evolved Universal Terrestrial Radio Access Network (E-UTRAN) or according to IEEE 802.11 a/h, b/g, n, ac and/or make use of radio frequencies according to IEEE 802.11 a/h, b/g, n, ac and/or data rates according to IEEE 802.11 a/h, b/g, n, ac.

Further, the wireless communication device includes a processor coupled to the first and the second radio interface and a memory coupled to the processor. The memory may include a ROM, e.g., a flash ROM, a RAM, e.g., a DRAM or SRAM, a mass storage, e.g., a hard disk or solid state disk, or the like. The memory includes suitably configured program code to be executed by the processor so as to implement the above-described functionalities of the wireless communication device. More specifically, the memory may include a module for accomplishing provision of: sending, to the first access node, first transmission delay information indicative of a transmission delay of the first link and/or second transmission delay information indicative of the second link. Additionally, the memory may include a module for accomplishing provision of: obtaining first transmission delay information indicative of a transmission delay of the first link and/or second transmission delay information indicative of the second link by the second access node.

It is to be understood that the structure as illustrated in FIG. 11 is merely schematic and that the wireless communication device may actually include further components which, for the sake of clarity, have not been illustrated, e.g., further interfaces or additional processors. Also, it is to be understood that the memory of the wireless communication device may include further types of program code modules, which have not been illustrated. For example, the memory may include program code modules for implementing typical functionalities of a wireless communication device, e.g. LTE and/or WLAN communication, or program code of one or more applications to be executed by the processor. According to some embodiments, also a computer program product may be provided for implementing concepts according to embodiments disclosed herein, e.g., a computer-readable medium storing the program code and/or other data to be stored in the memory.

The wireless communication device may further comprise one or modules for carrying out the embodiments as described with regards to FIGS. 1-8.

Thus according to an embodiment the wireless communication device comprises an interface and at least one processor, wherein at least one processor is adapted to send, via the interface to the first access node, the first transmission delay information.

According to another embodiment the wireless communication device is adapted to perform a method according to any one of embodiment of FIGS. 1-8.

Modifications and other embodiments of the disclosed embodiments(s) will come to mind to one skilled in the art having the benefit of the teachings presented in the foregoing descriptions and the associated drawings. Therefore, it is to be understood that the described embodiments(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method associated with controlling transmission of at least one data unit via a first link between a first access node and a wireless communication device and via a second link between a second access node and the wireless communication device, the method performed by the wireless communication device, and comprising:
   sending, to the first access node, first transmission delay information indicative of a transmission delay of the first link and/or second transmission delay information indicative of the second link, wherein at least one of the first transmission delay information and the second transmission delay information comprises a highest sequence number of a data unit among data units, which data unit was successfully sent to the wireless communication device.

2. The method according to claim 1, wherein the first and/or second transmission delay information comprises at least one of:
   a transmission delay for the transmission via the first link and/or the second link;
   time difference information specifying a time difference between a first transmission delay for a transmission via a first link, and a second transmission delay for a transmission via the second link;
   throughput information specifying a first throughput for data units via the first link and/or a second throughput for data units via the second link;
   information specifying a number of not successfully received data units;
   identification information identifying a sequence number of not successfully received data units;
   a highest sequence number of a data unit among data units, wherein the data unit was successfully sent by the second access node; and
   information specifying an amount of data to be storable in the second access node.

3. The method according to claim 1, wherein the transmission delay of the first link comprises at least one of a transmission time via the first link, a processing time of a data unit at the first access node, and a processing time at the wireless communication device.

4. The method according to claim 1, wherein the transmission delay of the second link comprises at least one of a processing time of a data unit at the first access node, a processing time at the second access node, and a transmission time via the second link.

5. The method according to claim 1, wherein the first transmission delay information is included in a packet data convergence protocol (PDCP) packet data unit (PDU).

6. The method according to claim 1, wherein the PDCP PDU is a PDCP control PDU, which comprises at least one of:
   information specifying that the PDCP control PDU only comprises control information; and
   information specifying that the transmission delay information is included in a PDCP data unit and comprises the transmission delay information.

7. A wireless communication device to be used in association with controlling transmission of at least one data unit via a first link between a first access node and a wireless communication device and via a second link between a second access node and the wireless communication device, the wireless communication device comprising:
   at least one processor;
   a non-transitory computer-readable storage medium, coupled to the at least one processor, further including computer-readable instructions, when executed by the at least one processor, are configured to:
   send, to the first access node, first transmission delay information indicative of a transmission delay of the first link and/or second transmission delay information indicative of the second link, wherein at least one of the first transmission delay information and the second transmission delay information comprises a highest sequence number of a data unit among data units, which data unit was successfully sent to the wireless communication device.

8. The wireless communication device according to claim 7, wherein the first and/or second transmission delay information comprises at least one of:
   a transmission delay for the transmission via the first link and/or the second link;
   time difference information specifying a time difference between a first transmission delay for a transmission via a first link, and a second transmission delay for a transmission via the second link;
   throughput information specifying a first throughput for data units via the first link and/or a second throughput for data units via the second link;
   information specifying a number of not successfully received data units;
   identification information identifying a sequence number of not successfully received data units;
   a highest sequence number of a data unit among data units, wherein the data unit was successfully sent by the second access node; and
   information specifying an amount of data to be storable in the second access node.

9. The wireless communication device according to claim 7, wherein the transmission delay of the first link comprises at least one of a transmission time via the first link, a processing time of a data unit at the first access node, and a processing time at the wireless communication device.

10. The wireless communication device according to claim 7, wherein the transmission delay of the second link comprises at least one of a processing time of a data unit at the first access node, a processing time at the second access node, and a transmission time via the second link.

11. The wireless communication device according to claim 7, wherein the first transmission delay information is included in a packet data convergence protocol (PDCP) packet data unit (PDU).

12. The wireless communication device according to claim 7, wherein the PDCP PDU is a PDCP control PDU, which comprises at least one of:
   information specifying that the PDCP control PDU only comprises control information; and
   information specifying that the transmission delay information is included in a PDCP data unit and comprises the transmission delay information.

13. A method associated with controlling transmission of at least one data unit via a first link between a first access node and a wireless communication device and via a second link between a second access node and the wireless communication device, the method performed by the second access node, and comprising:
   sending, to the first access node, first transmission delay information indicative of a transmission delay of the first link and/or second transmission delay information indicative of the second link, wherein at least one of the first transmission delay information and the second transmission delay information comprises a highest sequence number of a data unit among data units, which data unit was successfully sent to the wireless communication device.

14. The method according to claim 13, wherein the first and/or second transmission delay information comprises at least one of:
   a transmission delay for the transmission via the first link and/or the second link;
   time difference information specifying a time difference between a first transmission delay for a transmission via a first link, and a second transmission delay for a transmission via the second link;
   throughput information specifying a first throughput for data units via the first link and/or a second throughput for data units via the second link;
   information specifying a number of not successfully received data units;
   identification information identifying a sequence number of not successfully received data units;
   a highest sequence number of a data unit among data units, wherein the data unit was successfully sent by the second access node; and
   information specifying an amount of data to be storable in the second access node.

15. A second access node to be used in association with controlling transmission of at least one data unit via a first link between a first access node and a wireless communication device and via a second link between the second access node and the wireless communication device, the second access node comprising:
   at least one processor;
   a non-transitory computer-readable storage medium, coupled to the at least one processor, further including computer-readable instructions, when executed by the at least one processor, are configured to:
   send, to the first access node, first transmission delay information indicative of a transmission delay of the first link and/or second transmission delay information indicative of the second link, wherein at least one of the first transmission delay information and the second transmission delay information comprises a highest sequence number of a data unit among data units, which data unit was successfully sent to the wireless communication device.

16. The second access node according to claim 15, wherein the first and/or second transmission delay information comprises at least one of:
- a transmission delay for the transmission via the first link and/or the second link;
- time difference information specifying a time difference between a first transmission delay for a transmission via a first link, and a second transmission delay for a transmission via the second link;
- throughput information specifying a first throughput for data units via the first link and/or a second throughput for data units via the second link;
- information specifying a number of not successfully received data units;
- identification information identifying a sequence number of not successfully received data units;
- a highest sequence number of a data unit among data units, wherein the data unit was successfully sent by the second access node; and
- information specifying an amount of data to be storable in the second access node.

* * * * *